(12) United States Patent
Egashira et al.

(10) Patent No.: US 7,635,730 B2
(45) Date of Patent: Dec. 22, 2009

(54) GOLF BALL MATERIAL, GOLF BALL, AND METHOD FOR PREPARING GOLF BALL MATERIAL

(75) Inventors: Yoshinori Egashira, Chichibu (JP); Eiji Takehana, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 216 days.

(21) Appl. No.: 11/647,173

(22) Filed: Dec. 29, 2006

(65) Prior Publication Data

US 2008/0161456 A1 Jul. 3, 2008

(51) Int. Cl.
*A63B 37/00* (2006.01)
*C08K 5/56* (2006.01)
*C08L 33/02* (2006.01)

(52) U.S. Cl. .................. 523/351; 524/204; 524/238; 524/239; 524/356; 524/357; 524/417; 525/106; 525/119; 525/130; 525/176; 525/183; 525/193; 525/195; 525/329.9; 525/330.2; 473/378; 473/385

(58) Field of Classification Search ........... None
See application file for complete search history.

(56) References Cited

U.S. PATENT DOCUMENTS

| | | | | |
|---|---|---|---|---|
| 3,267,083 A | * | 8/1966 | Imhof | 525/330.2 |
| 4,766,174 A | * | 8/1988 | Statz | 525/64 |
| 5,028,508 A | * | 7/1991 | Lane et al. | 430/115 |
| 5,306,760 A | | 4/1994 | Sullivan | |
| 5,312,857 A | | 5/1994 | Sullivan | |
| 5,350,783 A | * | 9/1994 | Reich | 523/124 |
| 2004/0044136 A1 | | 3/2004 | Kim | |

FOREIGN PATENT DOCUMENTS

WO  WO 98/46671 A1  10/1998

OTHER PUBLICATIONS

Dow Chemical Product sheet for PRIMACOR 59801—no date.*
Lane, "Metal Salts of beta Diketones as Charging Additives", Proceedings of SPIE vol. 1253, pp. 29-36; 1990.*

* cited by examiner

*Primary Examiner*—David Buttner
(74) *Attorney, Agent, or Firm*—Sughrue Mion, PLLC

(57) ABSTRACT

The invention provides a golf ball material which includes, in mixture: (A) a metal-containing chelating agent (A1) or a mixture (A2) composed of a metal-containing chelating agent and an oxygen-containing inorganic metal compound; (B) one or more polymers selected from the group consisting of diene polymers, thermoplastic polymers and thermoset polymers; and (C) one or more acid-containing polymers having an acid content of from 0.5 to 30 wt % and selected from the group consisting of olefin-unsaturated carboxylic acid copolymers, olefin-unsaturated carboxylic acid-unsaturated carboxylic acid ester terpolymers, unsaturated carboxylic acid anhydride-containing polymers, unsaturated dicarboxylic acid-containing polymers and unsaturated dicarboxylic acid half ester-containing polymers. The invention also provides a method for preparing such a golf ball material, and a golf ball made with the material. The golf ball material has a good thermal stability, flow and processability, making it suitable for injection molding. Moreover, this material is ideal for producing, without any loss in the rebound resilience of golf ball parts molded from the material, high-performance golf balls endowed with excellent durability, scuff resistance and flexibility.

28 Claims, No Drawings

GOLF BALL MATERIAL, GOLF BALL, AND METHOD FOR PREPARING GOLF BALL MATERIAL

BACKGROUND OF THE INVENTION

The present invention relates to a golf ball material which has a good thermal stability, flow and processability and from which there can be obtained high-performance golf balls having excellent properties such as rebound and durability. The invention relates also to a golf ball which includes as a component therein a molded part made from such a golf ball material, and to a method for preparing such a golf ball material.

In recent years, ionomeric resins have been widely used in cover materials for golf balls. Ionomeric resins are ionic copolymers of an olefin such as ethylene with an unsaturated carboxylic acid such as acrylic acid, methacrylic acid or maleic acid, in which some of the acid groups are neutralized with metal ions such as sodium, lithium, zinc or magnesium. These resins provide excellent characteristics in terms of durability, rebound and scuff resistance of the ball.

At present, the base resins used in golf ball cover materials are generally ionomeric resins, but various improvements are being made to address the constant desire by players for golf balls having a high rebound and an excellent flying performance.

For example, cover materials composed of an ionomeric resin to which a large amount of a metallic soap has been added have been disclosed (Patent Document 1: U.S. Pat. No. 5,312,857; Patent Document 2: U.S. Pat. No. 5,306,760; Patent Document 3: International Application WO 98/46671) as ways of improving the rebound resilience and the cost characteristics of ionomer cover materials However, the metallic soap in these prior-art cover materials undergo decomposition and vaporization during injection molding, generating a large amount of fatty acid gases. As a result, molding defects tend to arise and the gases that have formed deposit on the surface of the molded part, markedly lowering its paintability. Moreover, such cover materials do not differ to any greater extent in their rebound resilience from ionomer covers of the same hardness that contain no metallic soap, having a rebound resilience which is either about the same or at best exhibits some modest improvement due to inclusion of the metallic soap, but in any case is not markedly improved. In addition, depending on the type of metallic soap used, significant declines in processability and resilience sometimes occur, making the cover material entirely unfit for practical use.

An ionomer that has recently been developed for use as a golf ball material is a homogeneous-phase, high-rebound-resilience material having an interpenetrating polymer network (IPN) structure (U.S. Published Patent Application No. 2004/0044136). The ionomer is prepared by blending a first component such as an ethylene-(meth)acrylic acid copolymer with a different type of thermoplastic resin as a second component to form a resin composition, then adding as a third component a metal ionic species to neutralize the acid groups on the first component dispersed in the resin composition. However, in this method, since a solid (i.e., a powder or granular material) such as a metal oxide, metal hydroxide or metal carbonate as the metal ionic species is directly used as it is, and also in case of a high acid content in the first component, the addition of a large amount of the metal ionic species is required for neutralizing the acid, during mixing the metal ionic species with the resin components, there are concerns about poor dispersion of the solid metal ionic species in the resin components, leading to plugging of the screen pack attached to the breaker plate on the extrusion die (and thus necessitating interruptions in production), or leaving some of the metal ionic species unreacted. In addition, given that a partial acid-neutralizing reaction (incomplete degree of neutralization) occurs and the target degree of neutralization cannot be achieved in a single-step reaction through one-pass extrusion, more than one pass be done, which concerns about lowering the physical properties of the resulting ionomer composition.

SUMMARY OF THE INVENTION

It is therefore an object of the invention to provide a golf ball material which is prepared by using a metal ion species to carry out to completion in a single-step reaction wherein the acid groups in an acid-containing polymer composition are neutralized to a target degree of neutralization, and which thus has a good thermal stability, flow and processability, and from which high-performance golf balls of an excellent durability, an excellent scuff resistance and a suitable hardness can be obtained without any loss of rebound resilience. Another object of the invention is to provide a golf ball which includes as a component therein a molded part made from such a golf ball material. A further object of the invention is to provide a method of preparing such a golf ball material.

As a result of extensive investigations, the inventors have discovered that by using (A) a metal ionic species which is either (A1) a metal-containing compound that has been "organified" to make it compatible with organic compounds that are polymers—that is, a metal-containing chelating agent, or (A2) a mixture of such a chelating agent and an oxygen-containing inorganic metal compound, and by using a twin-screw reaction-extruder having a kneading disc zone to mix component A together with an acid-containing polymer composition prepared by mixing (B) one or more polymers selected from the group consisting of diene polymers, thermoplastic polymers and thermoset polymers with (C) one or more acid-containing polymers selected from the group consisting of olefin-unsaturated carboxylic acid copolymers, olefin-unsaturated carboxylic acid-unsaturated carboxylic acid ester terpolymers, unsaturated carboxylic acid anhydride-containing polymers, unsaturated dicarboxylic acid-containing polymers and/or unsaturated dicarboxylic acid half ester-containing polymers, the acid-neutralizing reaction by component A with the acid groups in components B and C proceeds smoothly, yielding a uniform material in a single step. The inventors have also found that when component A is added to component C alone in the absence of above component B, the neutralizing reaction with the acid groups in component C proceeds smoothly, yielding an ionomer material suitable for use in golf balls. These golf ball materials have a surprisingly good thermal stability, flow and processability, making them suitable for injection molding, and have thus been found to be ideal for producing, without any loss in the rebound resilience of parts molded from the material, high-performance golf balls having an excellent durability, an excellent scuff resistance and a suitable hardness. Moreover, the resulting golf ball materials can be colored according to the type of metal in the metal-containing chelating agent that is used.

The inventors have also discovered from additional investigations that golf balls in which a molded part made from such a golf ball material is used as a ball component (e.g., a cover material in a two-piece solid golf ball composed of a core and a cover embracing the core, or a cover material or an intermediate layer material in a multi-piece solid golf ball composed of a core of at least one layer, at least one intermediate layer encasing the core and at least one cover layer encasing the intermediate layer) exhibit an excellent durability, an excellent scuff resistance and a suitable hardness without any loss of rebound resilience.

Accordingly, the invention provides the golf ball materials, golf balls, and methods for preparing golf ball materials shown in [I] to [IV] below.

[I] A golf ball material comprising:
 (A) a metal-containing chelating agent (A1) or a mixture (A2) composed of a metal-containing chelating agent and an oxygen-containing inorganic metal compound;
 (B) one or more polymers selected from the group consisting of diene polymers, thermoplastic polymers and thermoset polymers; and
 (C) one or more acid-containing polymers having an acid content of from 0.5 to 30 wt % and selected from the group consisting of olefin-unsaturated carboxylic acid copolymers, olefin-unsaturated carboxylic acid-unsaturated carboxylic acid ester terpolymers, unsaturated carboxylic acid anhydride-containing polymers, unsaturated dicarboxylic acid-containing polymers and unsaturated dicarboxylic acid half ester-containing polymers;
which is obtained by blending component A with a mixture of component B and component C.

[II] A golf ball material comprising:
 (A) a metal-containing chelating agent (A1) or a mixture (A2) composed of a metal-containing chelating agent and an oxygen-containing inorganic metal compound; and
 (C) one or more acid-containing polymers having an acid content of from 0.5 to 30 wt % and selected from the group consisting of olefin-unsaturated carboxylic acid copolymers, olefin-unsaturated carboxylic acid-unsaturated carboxylic acid ester terpolymers, unsaturated carboxylic acid anhydride-containing polymers, unsaturated dicarboxylic acid-containing polymers and unsaturated dicarboxylic acid half ester-containing polymers;
which is obtained by blending component A with component C.

[III] A method for preparing a golf ball material comprising, in a mixture:
 (A) a metal-containing chelating agent (A1) or a mixture (A2) composed of a metal-containing chelating agent and an oxygen-containing inorganic metal compound;
 (B) one or more polymers selected from the group consisting of diene polymers, thermoplastic polymers and thermoset polymers; and
 (C) one or more acid-containing polymers having an acid content of from 0.5 to 30 wt % and selected from the group consisting of olefin-unsaturated carboxylic acid copolymers, olefin-unsaturated carboxylic acid-unsaturated carboxylic acid ester terpolymers, and unsaturated carboxylic acid anhydride-containing polymers, unsaturated dicarboxylic acid-containing polymers and unsaturated dicarboxylic acid half ester-containing polymers,
the method being comprised of carrying out a reaction of (A1) and/or (A2) with a mixture of components B and C in a single step, to neutralize the acid groups in the acid-containing polymer.

[IV] A golf ball which includes a part molded from the above golf ball material, and preferably a golf ball wherein the golf ball material is used as a cover material in a two-piece solid golf ball having a core and a cover encasing the core, or as a cover material or an intermediate layer material in a multi-piece solid golf ball having a core of at least one layer, at least one intermediate layers encasing the core, and a cover of at least one layer encasing the intermediate layers.

DETAILED DESCRIPTION OF THE INVENTION

The invention is described more fully below.

The present invention is characterized by mixing (A) a metal-containing chelating agent (A1) or a mixture (A2) composed of a metal-containing chelating agent and an oxygen-containing inorganic metal compound, (B) one or more polymers selected from the group consisting of diene polymers, thermoplastic polymers and thermoset polymers, and (C) one or more acid-containing polymers having an acid content of from 0.5 to 30 wt % and selected from the group consisting of olefin-unsaturated carboxylic acid copolymers, olefin-unsaturated carboxylic acid-unsaturated carboxylic acid ester terpolymers, unsaturated carboxylic acid anhydride-containing polymers, unsaturated dicarboxylic acid-containing polymers and unsaturated dicarboxylic acid half ester-containing polymers; and smoothly carrying a reaction to neutralize the acid groups in component C and thereby obtain a golf ball material.

The invention is also characterized by adding component A to component C alone in the absence of component B, and smoothly carrying out a reaction to neutralize the acid groups in component C and thereby obtain an ionomeric material for golf balls.

The invention is additionally characterized by also mixing, together with above components A to C, a norbornene dicarboxylic anhydride and/or a derivative thereof and also a peroxide, and carrying out simultaneously both a neutralization reaction and a grafting reaction so as to obtain a golf ball material.

In the present invention, to produce a better golf ball material by having acid-neutralizing reactions proceeded to a target degree of neutralization in a single step, and thus to avoid the thermal history associated with a polymer material obtained after a plurality of extruder passes, the metal ionic species (A) selected for use is (A1) a metal-containing chelating agent or (A2) a mixture of a metal-containing chelating agent with an oxygen-containing inorganic metal compound.

The metal ionic species (A) is a metal-containing chelating agent (A1) in which the metal is of one or more types selected from the group composed of metals having a valence of 1, 2 or 3. Illustrative, non-limiting, examples include $Li^+$, $Na^+$, $K^+$, $Mg^{2+}$, $Zn^{2+}$, $Ni^{2+}$, $Ba^{2+}$, $Co^{2+}$, $Mn^{2+}$, $Cu^{2+}$, $Ca^{2+}$, $Cr^{2+}$, $Co^{3+}$, $Cr^{3+}$, $Fe^{3+}$ and $Al^{3+}$.

Illustrative, non-limiting, examples of the chelating agent include one or more chelating agents selected from the group consisting of aminocarboxylic acids, polycarboxylic acids, hydroxycarboxylic acids, polyphosphoric acids, β-diketones, polyimines, polyamines and derivatives thereof. Specific examples include ethylenediaminetetraacetic acid, nitrilotriacetic acid, diethylenetriaminepentaacetic acid, dicarboxymethylglutamic acid, tetrahydrofuran-2,3,4,5-tetracarboxylic acid, hydroxyethylethylenediaminetriacetic acid, nitrilotris(methylenephosphoric acid), hexametapolyphosphoric acid, tripolyphosphoric acid, alkyl acetoacetates (e.g., ethyl acetoacetate, methyl acetoacetate), acetylacetone (acetylacetonate), polyethyleneimine (Mw, 10,000) and polyallylamine (Mw, 10,000). Chelating agents having a low reactivity with the carboxylic acid groups in component C are more preferred, in view of which hydroxyl group-containing chelating agents and amino group (including imino group, but excluding tertiary amino group)-containing chelating agents are not desirable.

Illustrative, non-limiting examples of the metal-containing chelating agent include ethylenediaminetetraacetic acid tetrasodium salt, ethylenediaminetetraacetic acid tetrapotassium salt, diethylenetriaminepentaacetic acid pentasodium salt, dicarboxymethylglutamic acid tetrasodium salt, ethylenediaminetetraacetic acid magnesium disodium salt, ethylenediaminetetraacetic acid manganese disodium salt, ethylenediaminetetraacetic acid copper disodium salt, ethylenediaminetetraacetic acid cobalt disodium salt, ethylenediaminetetraacetic acid zinc disodium salt, diethylenetriaminepentaacetic acid iron disodium salt, sodium methyl acetoacetate, copper ethyl acetoacetate, aluminum dibutoxidebis(ethyl acetoacetate), lithium acetylacetonate, sodium hexafluoroacetylacetonate, calcium acetylacetonate, magnesium acetylacetonate, zinc acetylacetonate, manganese acetylacetonate, copper acetylacetonate, nickel acetylacetonate, barium acetylacetonate and aluminum acetylacetonate.

The metal ionic species on the oxygen-containing inorganic metal compound in the mixture (A2) of a metal-containing chelating agent and an oxygen-containing inorganic metal compound serving as above component A is one or more selected from among groups IA, IB, IIA, IIB, IIIA, IIIB, IVA, IVB, VA, VB, VIA, VIB, VIIB and VIIIB in the periodic table. This oxygen-containing inorganic metal compound is generally used in the form of ultrafine particles or a masterbatch.

The oxygen-containing inorganic metal compound in (A2) has an average particle size which is preferably in a range of from 0.001 to 50 μm. The proportion of metal-containing chelating agent in the mixture of a metal-containing chelating agent with an oxygen-containing inorganic metal compound is preferably from 0.1 to 99.9 wt %, and more preferably from 1.0 to 99.0 wt %.

The ultrafine particles of oxygen-containing inorganic compound in (A2) have an average particle size in a range of preferably from 0.005 to 0.1 μm, and have a particle size distribution of preferably 0.001 to 1.0 μm. These particles, when used, exhibit a good surface activity compared with ordinary particles having a particle size of several tens of microns, and thus have a high reactivity to acids, in addition to which they have a good dispersibility, making them well-suited to the purposes of the invention.

If the acid-neutralizing reaction is carried out on the acid-containing polymer composition using, without any modification, an oxygen-containing inorganic compound having a conventional particle size of several tens of microns, the unreacted oxygen-containing inorganic compound remains in the form of undispersed masses. In such cases, by making a plurality of extruding passes, the acid-neutralizing reaction can be completed to the target degree of neutralization. To illustrate, U.S. Published Patent Application No. 2004/0044136 describes an example in which magnesium hydroxide is used as the metal ionic species and the acid-containing polymer is passed several times through a twin-screw extruder to effect the acid-neutralizing reaction.

The ultrafine particles of oxygen-containing inorganic compound in above (A2) are preferably selected from among metal oxides, metal carbonates and metal hydroxides having a low moisture absorption. Moreover, the metal ionic species (A) is selected from among groups IA, IB, IIA, IIB, IIIA, IIIB, IVA, IVB, VA, VB, VIA, VIB, VIIB and VIIIB in the periodic table. Illustrative, non-limiting, examples of the ultrafine particles of oxygen-containing inorganic compound include lithium carbonate, sodium carbonate, potassium carbonate, magnesium carbonate, calcium carbonate, magnesium oxide, zinc oxide, calcium oxide and magnesium hydroxide. Any one or combination of two or more thereof may be used. Using these oxygen-containing inorganic compound particulates in the reaction to neutralize the acid groups in the acid-containing polymer composition provides such advantages as (1) allowing the reaction to take place smoothly (indicating a high neutralization reactivity with respect to the acid groups), and (2) low corrosion to production equipment compared with metal acetates (which release acetic acid corrosive to the production equipment following neutralization).

The oxygen-containing inorganic compound in (A2) is used in a masterbatched form. In such a case, the masterbatched form is used in place of, or in combination with, the above-described ultrafine particles of the oxygen-containing inorganic compound. The oxygen-containing inorganic compound used in the masterbatch has an average particle size of generally from 0.005 to 50 μm and a particle size distribution of generally 0.001 to 300 μm. Although these particles need not be as finely pulverized as the above-described ultrafine particles of oxygen-containing inorganic compound, if the average particle size is too large, the acid-neutralizing reaction does not go to completion. On the other hand, if the average particle size is too small, dispersion during masterbatch preparation becomes poor. As used herein, "average particle size" and "particle size distribution" refer to values obtained by particle size distribution measurement using a laser diffraction technique (laser diffraction/scattering).

By using the oxygen-containing inorganic compound in above (A2) in a masterbatched form (referred to below simply as a "masterbatch"), the oxygen-containing inorganic metal compound can be uniformly dispersed in the acid-neutralizing reaction with components B and C of the acid-containing polymer composition, thus promoting more uniform reaction and in turn contributing to uniform properties in the resulting golf ball material. On the other hand, if the oxygen-containing inorganic metal compound is not masterbatched and is instead mixed directly with components B and C of the polymer composition, it is difficult to uniformly disperse the oxygen-containing inorganic metal compound in the polymer composition. Powdery masses are formed, resulting in inhomogeneous reactions, which in turn give rise to non-uniformity in the golf ball material. In particular, if the oxygen-containing inorganic metal compound is used in the form of a coarse powder, undispersed masses remain in the golf ball material. Also, by preferentially masterbatching an organic acid-free oxygen-containing inorganic metal compounds which does not release organic acid following the acid-neutralizing reaction, it is possible to promote the reaction and obtain a uniform material.

When the oxygen-containing inorganic compound in (A2) is used in the form of a masterbatch thereof, the metal ionic species included therein are metal oxides, metal carbonates or metal hydroxides, and the metal ionic species are selected from among groups IA, IB, IIA, IIB, IIIA, IIIB, IVA, IVB, VA, VB, VIA, VIB, VIIB and VIIIB in the periodic table. Illustrative, non-limiting, examples include lithium carbonate, sodium carbonate, potassium carbonate, magnesium carbonate, zinc carbonate, magnesium hydroxide, magnesium oxide, calcium hydroxide, calcium oxide and zinc oxide, any one or more of which are used.

The concentration of the oxygen-containing inorganic metal compound in the above-described oxygen-containing inorganic metal compound masterbatch is typically from 10 to 90 wt %, preferably from 20 to 80 wt %, and more preferably from 30 to 70 wt %. If the concentration of the oxygen-containing inorganic metal compound in the masterbatch is too high, the masterbatch has an unacceptably low melt flow rate (MFR) of below 0.1 g/10 min. In such a case, when the masterbatch is blended together with the above-described components B and C, the oxygen-containing inorganic metal compound in the masterbatch does not disperse well. On the other hand, if the concentration is low, the amount of the masterbatch added is larger, as a result of which the high-MFR base polymers (particularly ethylene waxes and low acid-content, high-MFR ethylene polymers) used in the masterbatch substantially lower the physical properties of the golf ball material.

It is advantageous for the base polymer used in the masterbatch to be one having a high melt flow rate (MFR). Specifically, the base polymer is typically one having a melt flow rate of preferably at least about 10 g/10 min, more preferably at least about 50 g/10 min, and even more preferably at least about 100 g/10 min. Use can also be made of a liquid wax such as a high-MFR ethylene wax, or a low acid-content, high-MFR ethylene polymer. Illustrative examples include polyethylene wax AC5120 (available from Tomen Plastics Corporation; acrylic acid content, 15 wt %; MFR, >1,000 g/10 min), Nucrel 599 (available from DuPont; methacrylic acid content, 10 wt %; MFR, 450 g/10 min), Nucrel 699 (available from DuPont; methacrylic acid content, 11 wt %; MFR, 100 g/10 min), and Nucrel N0200H (available from DuPont; methacrylic acid content, 2 wt %; MFR, 130 g/10 min).

The amount of the metal ionic species (A) included in the golf ball material of the invention is determined by the target degree of neutralization of the acid groups present in the acid-containing polymer composition (components B and C). An excessively large component A results in a high degree of neutralization, lowering the melt flow rate (MFR) of the golf ball material and thus adversely affecting the processability. On the other hand, an excessively small component A diminishes the physical properties of the golf ball material and result in a poor rebound resilience and a poor durability in golf balls obtained therefrom.

The method for preparing a masterbatch of the oxygen-containing inorganic compound in A2 involves the use of an apparatus selected from among twin-screw/single-screw extruders (including kneader-extruders) equipped with a kneader such as a pressurizing kneader and a force feeder, tandem extruders (consisting of a twin-screw extruder for upstream processing and a vacuum-vented extruder for downstream processing), and vacuum-vented twin-screw extruders. It is preferable either to use a twin-screw/single-screw extruder equipped with a kneader and a force feeder or to use a tandem extruder. Using these extruders, the oxygen-containing inorganic compound and the base polymer are dry-blended or are charged to a hopper from separate feeders and mixed, then pelletized so as to obtain a masterbatch having an MFR in a range of from 0.1 to 100 g/min. The mixing temperature of the masterbatch is adjusted within a range of 50 to 220° C., and preferably 80 to 200° C.

Component B in the invention is one or more polymers selected from the group consisting of diene polymers, thermoplastic polymers and thermoset polymers. Illustrative examples include one or more polymers selected from the group consisting of polyolefin elastomers (including polyolefins and metallocene polyolefins), polystyrene elastomers, polyacrylate polymers, polyamide elastomers, polyurethane elastomers, polyester elastomers, diene polymers, polyacetals (POM), epoxy resins, unsaturated polyester resins, silicone resins and ABS resins.

In the golf ball material of the invention, when component B is a thermoplastic polymer, the weight ratio of component B to component C (B/C) in the acid-containing polymer composition of components B and C is from 99/1 to 1/99.

Alternatively, when component B is a thermoset polymer, the weight ratio of component B to component C (B/C) in the acid-containing polymer composition of components B and C is from 49/51 to 1/99.

Component C in the inventive golf ball material is a polymer composition which has an acid content of from 0.5 to 30 wt %, and preferably from 1.0 to 25 wt %, and is one or more selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers.

When component C is an olefin-unsaturated carboxylic acid copolymer, the olefin is generally one having at least 2 carbons, but not more than 8 carbons, and especially not more than 6 carbons. Illustrative examples of such olefins include ethylene, propylene, butene, pentene, hexene, heptene and octene. Ethylene is especially preferred. Illustrative examples of the unsaturated carboxylic acid include acrylic acid, methacrylic acid, dimethylacrylic acid, ethacrylic acid, maleic acid, maleic anhydride, and fumaric acid. Acrylic acid and methacrylic acid are especially preferred.

When component C is an olefin-unsaturated carboxylic acid-unsaturated carboxylic acid ester terpolymer, the olefin and the unsaturated carboxylic acid are exemplified by the same olefins and unsaturated carboxylic acids as in the above-described olefin-unsaturated carboxylic acid copolymer. The unsaturated carboxylic acid ester is preferably a lower alkyl ester of the above unsaturated carboxylic acids, illustrative examples of which include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, isobutyl acrylate) is especially preferred.

When component C is selected from among unsaturated carboxylic anhydride-containing polymers, unsaturated dicarboxylic acid-containing polymers and unsaturated dicarboxylic acid half ester-containing polymers, a polymer composed of an olefin and at least one compound selected from among unsaturated carboxylic anhydrides, unsaturated dicarboxylic acids and unsaturated dicarboxylic acid half esters is preferred. Examples of unsaturated carboxylic anhydrides include maleic anhydride and itaconic anhydride, with maleic anhydride being especially preferred. Examples of unsaturated dicarboxylic acids include maleic acid, fumaric acid and itaconic acid. Examples of unsaturated dicarboxylic acid half esters include monoesters of the foregoing dicarboxylic acids, such as monoethyl ester of maleic acid, monomethyl ester of fumaric acid and monoethyl ester of itaconic acid. Monoethyl ester of maleic acid is especially preferred.

The olefin is preferably one having generally at least two carbons, but not more than 8 carbons, and especially not more than 6 carbons. Examples of such olefins include ethylene, propylene, butene, pentene, hexene, heptene and octene. Of these, the use of ethylene is especially preferred.

The unsaturated carboxylic anhydride-containing polymer, unsaturated dicarboxylic acid-containing polymer and unsaturated dicarboxylic acid half ester-containing polymer in above component C are exemplified by, but not limited to, the following polymers:

(i) olefin polymers onto which has been grafted an unsaturated carboxylic anhydride, an unsaturated dicarboxylic acid and/or an unsaturated carboxylic acid;

(ii) olefin-unsaturated carboxylic acid polymers onto which has been grafted an unsaturated carboxylic anhydride, an unsaturated dicarboxylic acid and/or an unsaturated carboxylic acid;

(iii) olefin-unsaturated carboxylic acid ester polymers onto which has been grafted an unsaturated carboxylic anhydride, an unsaturated dicarboxylic acid and/or an unsaturated carboxylic acid;

(iv) olefin-unsaturated carboxylic acid-unsaturated carboxylic acid ester polymers onto which has been grafted an unsaturated carboxylic anhydride, an unsaturated dicarboxylic acid and/or an unsaturated carboxylic acid;

(v) olefin-unsaturated carboxylic anhydride-unsaturated carboxylic acid ester polymers;

(vi) olefin-unsaturated dicarboxylic acid-unsaturated carboxylic acid ester polymers; and (vii) olefin-unsaturated dicarboxylic acid half ester-unsaturated carboxylic acid ester polymers.

Each of the above copolymers can be obtained using a known method for copolymerization and grafting. If the acid content in the copolymer is too low, the reactivity and strength (tensile strength at break) decrease. If it is too high, the processability decreases.

Examples of commercial products that can be used as component C include olefin-unsaturated carboxylic acid polymers such as Nucrel 960 and Nucrel 2806 (both products of DuPont), and ESCOR 5200, ESCOR 5100 and ESCOR 5000 (all products of Exxon-Mobil Chemical).

Examples of olefin-unsaturated carboxylic acid-unsaturated carboxylic acid ester polymers include Bynel 2002, Bynel 2014, Bynel 2022 and Bynel E403 (all products of DuPont), and ESCOR ATX325, ESCOR ATX320 and ESCOR ATX310 (all products of Exxon-Mobil Chemical).

Examples of unsaturated carboxylic anhydride polymers include MODIPER A8100, MODIPER A8200 and MODIPER A8400 (all products of NOF Corporation), and LOTADER 3200, LOTADER 3300, LOTADER 5500, LOTADER 6200, LOTADER 7500, LOTADER 8200, LOTADER TX8030 and LOTADER TX8390 (all products of ARKEMA).

Examples of commercial unsaturated carboxylic anhydride-grafted polymers that can be used include Polybond 3009, Polybond 3200 and Royaltough 498 (all products of Uniroyal Chemical), ADOMER NF518 and ADOMER QE800 (both products of Mitsui Chemicals, Inc.), Bynel 2167, Bynel 2174, Bynel 4206, Bynel 4288, Bynel 50E561 and Bynel 50E571 (all products of DuPont), and Exxelor VA1801, Exxelor VA1803, Exxelor VA1840 and Exxelor PO1020 (all products of Exxon-Mobil Chemical).

In the golf ball material of the invention, by also including in mixture, together with the above-described essential components A, B and C, a norbornene dicarboxylic anhydride and/or a derivative thereof and a peroxide, and by carrying out the acid-neutralizing reaction together with a grafting reaction of the norbornene dicarboxylic anhydride and/or a derivative thereof, there can be obtained a resin composition having an interpenetrating network (IPN) structure which suppresses delamination raised by component B. The norbornene dicarboxylic anhydride and/or derivative thereof are exemplified as follows.

Norbornene ring derivatives include halogen-, alkyl-, aryl- and aralkylnorbornenes; and dicarboxylic anhydride derivatives include dicarboxylic acids, dicarboximides and derivatives thereof. Stereoisomers of dicarboxylic anhydrides and their derivatives include the exo isomers, endo isomers and mixtures thereof. Illustrative examples include cis-5-norbornene-endo-2,3-dicarboxylic anhydride, cis-5-norbornene-exo-2,3-dicarboxylic anhydride, methyl-cis-5-norbornene-endo-2,3-dicarboxylic anhydride, cis-5-norbornene-endo-2,3-dicarboximide and 1,4,5,6,7,7-hexachloro-5-norbornene-2,3-dicarboxylic anhydride.

These compounds are included in an amount, per 100 parts by weight of above components B and C combined, of generally from 0.05 to 20 parts by weight, preferably from 0.1 to 10 parts by weight, and more preferably from 0.5 to 5.0 parts by weight. If these compounds are added in excess, the resulting resin composition exhibits a drastic decline in melt flow rate (MFR) and undergoes gel formation, which makes it impossible to obtain normal molded parts. Conversely, if these compounds are added in too small an amount, the resulting resin composition causes delamination to occur during injection molding, possibly resulting in a poor scuff resistance and a low rebound resilience, and thus having an adverse influence on the properties of the golf ball obtained as the finished product.

When a norbornene dicarboxylic anhydride and/or a derivative thereof is also included in the golf ball material of the invention, during preparation of the resin composition containing above components A, B and C, a resin composition having an IPN structure can be obtained by melt-mixing components B and C with the norbornene dicarboxylic anhydride and/or derivative thereof and a peroxide at a low temperature at which the peroxide does not decompose prematurely, then adding the metal ion species (the oxygen-containing inorganic metal compound, etc.) of component A and melt-mixing at or above the temperature at which the peroxide decomposes so as to effect both the grafting reaction of the norbornene dicarboxylic anhydride and/or a derivative thereof and the acid-neutralizing reaction. It is preferable here to follow a procedure in which first the norbornene dicarboxylic anhydride and/or a derivative thereof, the peroxide and component B are melt-mixed at a temperature low enough so that the peroxide does not decompose prematurely, then the acid-containing polymer serving as component C is melt-mixed at a temperature low enough so that the peroxide does not decompose, following which the metal ionic species (oxygen-containing inorganic metal compound) of component A is added and melt-mixing is carried out at or above the temperature at which the peroxide decomposes so as to carry out both the grafting reaction of the norbornene dicarboxylic anhydride and/or a derivative thereof and the acid-neutralizing reaction.

The peroxide used together with the norbornene dicarboxylic anhydride and/or a derivative thereof are selected as appropriate based on the decomposition temperature thereof and the melting temperature at which component B and/or component C can be kneaded. The peroxide typically has a 1-minute half-life temperature of from 140 to 250° C., preferably from 150 to 230° C., and more preferably from 160 to 210° C. Illustrative examples of such peroxides that can be utilized include one or more selected from among dicumyl peroxide (1-minute half-life temperature, 175° C.), di-t-butyl peroxide (185° C.), 2,5-dimethyl-2,5-di(t-butylperoxy)-3-hexyne (194° C.), n-butyl-4,4-di(t-butyl-peroxy)valerate (173° C.), di(2-t-butylperoxyisopropyl)benzene (175° C.), di-t-hexyl peroxide (177° C.) and p-menthanehydro-peroxide (200° C.). Of these, the use of dicumyl peroxide, di-t-butyl peroxide and 2,5-dimethyl-2,5-di(t-butylperoxy)-3-hexyne is preferred. It is desirable to set the amount of the peroxide included, based on the combined amount of components B and C, at preferably from 0.01 to 20 parts by weight, more preferably from 0.05 to 15 parts by weight, even more preferably from 0.09 to 10 parts by weight, and most preferably from 0.1 to 5.0 parts by weight.

The inventive method for preparing a golf ball material is a method in which the acid-neutralizing reaction by the metal ion species (component A) with the acid-containing polymer composition composed of at least two different polymers (components B and C) is carried out in a single step. The acid-neutralizing reaction can be carried out in a single step using, for example, an internal mixer such as a kneading-type twin-screw extruder, a Banbury mixer, a kneader or a Labo Plastomill. The extruder used for preparing the golf ball material is preferably a twin-screw extruder. A twin-screw extruder having features (i) to (v) below is especially preferred.

(i) An effective screw length L/D (i.e., screw length-to-diameter ratio) of 20 or more, preferably 25 or more, and more preferably 30 or more.

(ii) A screw segment configuration such that the L/D/ ratio of the kneading disc zone is from 10 to 90%, preferably from 20 to 80%, and more preferably from 30 to 70%, of the overall L/D.

Also, the discs in the kneading disc zone of the twin-screw extruder include right-handed kneading discs, left-handed kneading discs, reverse discs, and various neutral discs.

(iii) A screw diameter of 15 mm or more.

(iv) Includes a vent port and a vacuum line connected thereto.

(v) Equipped with a device for the dropwise addition or pressurized injection of a liquid.

In the single-step acid-neutralizing reaction of the invention, above components B and C are melt-mixed to form a molten polymer composition of components B and C. Above component A, that is, (A1) and/or (A2), is then blended into the molten polymer composition, and at least some of the acid groups present in the polymer composition (components B and C) are neutralized. A liquid is added (by injection under pressure or dropwise addition) to promote this acid-neutralizing reaction. The liquid in this case is preferably a compound of the formula ROH, where R represents a hydrogen or an alkyl group. The amount of the liquid added, based on the overall output, is preferably from about 0.1 to about 10 wt %, more preferably from about 0.5 to about 8 wt %, and even more preferably from about 1.0 to about 5.0 wt %.

The heating conditions can be set to, for example, from 100 to 250° C., although melt-mixing is preferably carried out at a temperature which exceeds both the melting point of component B and the melting point of component C.

Although the mixing method is not subject to any particular limitation, for better microdispersion of component B it is preferable to first thoroughly melt-mix components B and C so as to form the polymer composition of components B and C, then to add and incorporate component A (i.e., component A1 and/or component A2). If additives are to be included, the additives can be added and blended into the composition following the incorporation of component A. If component B is excluded and only component C is to be subjected to the acid-neutralizing reaction, it suffices to melt-mix only components C and A. A liquid can be added (by injection under pressure or dropwise addition) to promote this acid-neutralizing reaction.

In the practice of the invention, the acid-neutralizing reaction by the metal ion species serving as component A, that is, a metal-containing chelating agent (A1) or a mixture (A2) of a metal-containing chelating agent and an oxygen-containing inorganic metal compound, with the acid-containing polymer composition (components B and C) is carried out in a single step. The acid-neutralizing reaction in the twin-screw extruder used for this purpose is carried out at a temperature setting of from 110 to 260° C., preferably from 130 to 240° C., and more preferably from 170 to 230° C. The output for a screw diameter D of 32 mm is from 2 to 60 kg/h, preferably from 5 to 50 kg/h, and more preferably from 10 to 40 kg/h. Moreover, letting the screw diameter ratio $D_1/D_2$ ($D_1$ being larger than $D_2$) be A, the extrusion rate during scale-up of the twin-screw extruder is proportional to A within a range of preferably from $A^{1.0}$ to $A^{3.0}$, and more preferably within a range of from $A^{1.5}$ to $A^{2.7}$.

It is preferable for the golf ball material of the invention to have a melt flow rate (MFR) within a specific range so as to ensure that it has flow properties suitable for injection molding and to improve its processability. Hence, the melt flow rate is generally at least 0.1 g/10 min, and preferably at least 0.5 g/10 min, but generally not more than 50 g/10 min, and preferably not more than 30 g/10 min. A melt flow rate which is too high or too low significantly lowers the processability. As used herein, "melt flow rate" refers to a measured value obtained according to JIS-K7210 at a test temperature of 190° C. and under a load of 21.18 N (2.16 kgf).

The golf ball material of the invention has, in Fourier transform infrared absorption spectroscopic (FT-IR) measurements, an absorption peak assigned to carbonyl stretching vibrations at 1690 to 1710 $cm^{-1}$ and an absorption peak assigned to the carboxylate anion stretching vibrations of a metal carboxylate at 1530 to 1630 $cm^{-1}$, confirming that the acid-neutralizing reaction has taken place and confirming the presence of ionic crosslinkages.

Molded parts obtained using the golf ball material of the invention have a Shore D hardness of generally at least 50, and preferably at least 52, but generally not more than 75, and preferably not more than 70. If the molded part has too high a Shore D hardness, the "feel" of the ball when hit diminishes significantly. On the other hand, if the Shore D hardness is too low, the rebound resilience of the ball decreases.

The golf ball material of the invention may additionally include optional additives as appropriate for the intended use. When the inventive golf ball material is used as a cover material, various additives such as pigments, dispersants, antioxidants, ultraviolet absorbers, light stabilizers and slip agents can be added to above components A to C. When such additives are included, they can be added in an amount of generally at least 0.05 part by weight, and preferably at least 0.1 part by weight, but generally not more than 10 parts by weight, and preferably not more than 4 parts by weight, per 100 parts by weight of above components A to C combined.

The golf ball material of the invention has a specific gravity of generally at least 0.9, preferably at least 0.92, and more preferably at least 0.94, but generally not more than 1.3, preferably not more than 1.2, and more preferably not more than 1.05.

The golf ball of the invention includes as an essential ball component a part molded from the above-described golf ball material of the invention. Parts molded from the inventive golf ball material can be used as either a portion of the golf ball or the entire golf ball. Examples include the cover of a thread-wound golf ball in which the cover has a single-layer structure or a multilayer structure of two or more layers; a one-piece golf ball; the solid core or cover of a two-piece solid golf ball; and the solid core, intermediate layer or cover of a multi-piece solid golf ball such as a three-piece solid golf ball. The inventive golf ball is not subject to any particular limitation, insofar as it is a golf ball that includes as a ball component therein a part molded from the golf ball material of the invention.

It is particularly advantageous for the golf ball material of the invention to be used as the cover material in a two-piece solid golf ball composed of a core and a cover encasing the core, or as the cover material or intermediate layer material in a multi-piece solid golf ball composed of a core of at least one layer, at least one intermediate layer encasing the core, and a cover of at least one layer encasing the intermediate layer.

As described above, the inventive golf ball material, and the inventive method of preparation thereof, enable neutralizing reactions on the acid in an acid-containing polymer to be carried out to completion in a single step, and thus have a good thermal stability, flow and processability without any loss of rebound resilience, enabling high-performance golf ball materials of excellent durability, excellent scuff resistance and a suitable hardness to be obtained. The golf ball material also has the additional advantage that it can be colored depending on the type of metal in the metal-containing chelating agent that is used.

EXAMPLES

A Reference Example and Examples of the invention are given below by way of illustration and not by way of limitation. The twin-screw extruder used in the examples of the invention for the acid-neutralizing reactions had a screw diameter of 32 mm, an overall L/D ratio of 41 and an L/D ratio in the kneading disc zone which was 40% of the overall L/D ratio, and was equipped with a vacuum-venting port and a water-injecting device.

Reference Example 1

Preparation of a Magnesium Hydroxide Masterbatch

A 5-liter pressurizing (compression) kneader (manufactured by Naniwa Machinery Manufacturing Co., Ltd.; temperature setting, 100° C.) was used to prepare a masterbatch (MB) from an ethylene-methacrylic acid-acrylic acid ester terpolymer (available from DuPont; MFR, 130 g/10 min) as the base polymer and magnesium hydroxide $Mg(OH)_2$ (Kyowa Chemical Industry Co., Ltd.; average particle size, 0.6 μm). The kneader was charged with a combined amount of 2.5 kg of the base polymer and the magnesium hydroxide in a 50/50 weight ratio, and mixing was carried out for 20 minutes under an applied pressure of 0.49 MPa at a rotor speed of 20 rpm and at a mixing temperature controlled so as not to exceed 105° C. The mixture was discharged as a strand from a 40 mm diameter twin-screw/single-screw extruder (Naniwa Machinery Manufacturing Co., Ltd.; temperature setting, 170° C.), then passed through a cooling water bath, through an air knife, and through a pelletizer. The melt flow rate of the resulting magnesium hydroxide masterbatch having a magnesium hydroxide content of 50 wt % was 1.9 g/10 min (measured at 190° C. under a load of 2,160 g). This magnesium hydroxide masterbatch is abbreviated below as "MgMB."

Experiment 1

An ethylene-methacrylic acid copolymer (Polymer 1) (produced by DuPont; MFR, 60 g/10 min) as component C and (A1) a Chelating agent β (magnesium acetyl acetonate dihydrate produced by Tokyo Kasei Kogyo Co., Ltd.) as component A were dry-blended in the proportions shown in Table 1. The blend was then fed to a twin-screw extruder hopper set at a temperature of 210° C. and subjected to an acid-neutralizing reaction (to a level of 40 mol % neutralization) at a screw speed of 120 rpm and an extrusion rate of 4.5 kg/hr while using a liquid injection pump to inject water along the twin-screw extruder in an amount of 3 wt % with respect to the resin output and while removing volatiles through the vacuum vent. The strands discharged from the extruder die were passed through a cooling water bath, excess water attached to the strands was removed with an air knife, and the strands were cut into pellets with a pelletizer, giving a uniform ionomer material. Pellets of the uniform, transparent ionomer material thus obtained were used to form a 3 mm thick sheet having a length and width of 150 mm each in a hot press molding machine. The sheet was visually examined, and found to be free of unreacted material and powdery masses.

In addition, titanium dioxide and a blue pigment were dry-blended with this uniform ionomer material in the proportions shown in Table 1, then melt-mixed in a twin-screw extruder set at 195° C. at a screw speed of 100 rpm and an output of 7.0 kg/hr while using a vacuum vent. The strands discharged from the extruder die were passed through a cooling water bath, following which excess water attached to the strands was removed with an air knife, and the strands were cut into pellets with a pelletizer, yielding a golf ball material (Ionomer 1). The properties of this golf ball material were evaluated. As shown in Table 1, the golf ball material had a suitable hardness and exhibited a melt flow rate which indicated that it was injection-moldable.

The above Ionomer 1 was employed as the cover material for a two-piece golf ball by being injection-molded over a core of crosslinked polybutadiene (core diameter, 38.9; weight, 36.0 g; compressive strain, 3.35 mm) using an injection molding machine (temperature settings: hopper, 160° C.; C1 to head, 180 to 210° C.) at an injection pressure of 5.9 MPa, a holding pressure of 4.9 MPa, an injection and holding time of 8 seconds, and a cooling time of 25 seconds, thereby producing two-piece golf balls (diameter, 42.7 mm; weight, 45.5 g). These golf balls were then evaluated. The results are shown in Table 1. After injection molding, the surface of the golf ball was trimmed, yielding a finished golf ball which, compared with the results obtained in the corresponding Control 1, had a smooth surface free of burrs, a good scuff resistance, good ball durability, a high initial velocity and a high coefficient of restitution (COR).

Experiment 2

Aside from using (A2) a Chelating agent α (Chelest Mg, produced by Chelest Corporation; ethylenediaminetetraacetic acid magnesium salt dihydrate) and the MgMB prepared in the reference example instead of (A1) Chelating agent β as component A, and adding (A2) in the proportion indicated in Table 1, the same procedures were carried out as in Experiment 1, thereby giving a uniform Ionomer 2. Evaluations were carried out on the resulting Ionomer 2 and golf balls made therewith, the results of which are shown in Table 1. Compared with the results obtained in the corresponding Control 2, these golf balls had a good scuff resistance and durability, a high initial velocity and a high coefficient of restitution.

Experiment 3

An acid-containing polymer composition was obtained by the preliminary mixture, in the proportions indicated in Table 1 and at a melting temperature at which the peroxide does not decompose (170° C.), of the respective ingredients, including 5-norbornene-2,3-dicarboxylic anhydride (NDA), but excluding the Chelating agent α and the metal oxide master batch MgMB. Next, the respective amounts of (A2) chelating agent α and MgMB shown in Table 1 were added to this polymer composition as component A, then both a neutralization reaction to 40 mol % neutralization and decomposition of the peroxide were carried out in a twin-screw extruder at a setting temperature of 210° C., thereby giving a uniform ionomeric resin composition (Ionomer 3). The melt flow rate (MFR) and hardness of the resulting Ionomer 3 are shown in Table 1. Ionomer 3 exhibited a suitable hardness and a melt flow rate appropriate for injection molding. The same two-piece ball manufacturing procedures as in Experiment 1 were carried out using this Ionomer 3, thereby producing two-piece golf balls (diameter, 42.7 mm; weight, 45.5 g). These golf balls were then evaluated. The results are shown in Table 1. The surface of the golf ball was trimmed, thereby yielding a finished golf ball which, compared with Control 3, had a smooth surface free of burrs, a good scuff resistance, excellent ball durability, a high initial velocity and a high coefficient of restitution (COR).

Control 1

As a control for Experiment 1, an Ionomer 1' was prepared by following the same procedures as in Experiment 1, but using the formulation shown in Table 1 in which magnesium hydroxide (Kisuma 1, produced by Kyowa Chemical Industry Co., Ltd.) instead of component (A1) Chelating agent β serves as component A. The properties of Ionomer 1' and golf balls obtained therewith were evaluated. The results are shown in Table 2.

The surface of the molded golf ball was trimmed, yielding a finished golf ball which, in contrast with Experiment 1, had some burrs thereon (a slightly rough surface), and also had inferior properties of scuff resistance, durability, initial velocity and coefficient of restitution.

In all of the above experiments, because a 60-mesh screen pack (composed of two screens) mounted on the twin-screw extruder's die breaker plate became plugged due to unreacted magnesium hydroxide during extrusion, the screen pack was removed and extrusion was continued.

Control 2

As a control for Experiment 2, an Ionomer 2' was prepared by following the same procedures as in Experiment 2, but using sodium carbonate (Tokujet, produced by Tokuyama Corporation) and magnesium hydroxide (Kisuma 1, produced by Kyowa Chemical Industry Co., Ltd.) instead of (A1) Chelating agent α. The properties of Ionomer 2' and golf balls obtained therewith were evaluated. The results are shown in Table 2.

The surface of the molded golf ball was trimmed, yielding a finished golf ball which, in contrast with Experiment 2, had some burrs thereon (a slightly rough surface), and also had inferior properties of scuff resistance, durability, initial velocity and coefficient of restitution.

As in Control 1, because a 60-mesh screen pack (composed of two screen layers) mounted on the twin-screw extruder's die breaker plate became plugged due to unreacted powder during extrusion, the screen pack was removed and extrusion was continued.

Control 3

As a control for Experiment 3, an Ionomer 3' was prepared by following the same procedures as in Experiment 3, but using sodium carbonate (Tokujet, produced by Tokuyama Corporation) and magnesium hydroxide (Kisuma 1, produced by Kyowa Chemical Industry Co., Ltd.) instead of the Chelating agent α and the metal oxide masterbatch MgMB. The properties of Ionomer 3' and golf balls obtained therewith were evaluated. The results are shown in Table 2.

The surface of the molded golf ball was trimmed, yielding a finished golf ball which, in contrast with Experiment 3, had burrs thereon (a rough surface), and also had inferior properties of scuff resistance, durability, initial velocity and coefficient of restitution.

As in Controls 1 and 2, because a 60-mesh screen pack (composed of two screen layers) mounted on the twin-screw extruder's die breaker plate became plugged due to unreacted powder during extrusion, the screen pack was removed and extrusion was continued.

TABLE 1

| Examples | Experiment | | |
|---|---|---|---|
| | 1 | 2 | 3 |
| Run | Ionomer 1 | Ionomer 2 | Ionomer 3 |
| a) Chelating agent α | — | 1.98 | 2.58 |
| b) Chelating agent β | 9.20 | — | — |
| c) MgMB | — | 3.10 | 1.39 |
| d) TPU | — | — | 20.0 |
| e) NDA | — | — | 0.7 |
| f) PO | — | — | 0.2 |
| g) Polymer 1 | 50 | 50 | 25.0 |
| h) Polymer 2 | 50 | 50 | 25.0 |
| i) Polymer 3 | — | — | 10.0 |
| j) Polymer 4 | — | — | 10.0 |
| k) Polymer 5 | — | — | 10.0 |
| l) $TiO_2$ | 2.5 | 2.5 | 2.5 |
| m) Blue pigment | 0.025 | 0.025 | 0.07 |
| MFR (g/10 min, 190° C.) | 1.8 | 2.7 | 2.4 |
| Hardness (Shore D) | 63 | 60 | 52 |
| Ultimate tensile strength (MPa) | 28 | 27 | 20 |
| Ultimate tensile elongation (%) | 282 | 303 | 341 |
| Deflection (mm) | 2.81 | 2.84 | 2.97 |
| Initial velocity (m/s) | 77.23 | 76.65 | 76.63 |
| Average COR ($1^{st}$ shot to $10^{th}$ shot) | 0.775 | 0.771 | 0.764 |
| Shot number (durability) | 208 | 247 | 299 |
| Scuff resistance | 2 | 2 | 3 |
| Abrasion resistance | 2 | 2 | 2 |
| Ball surface after trimming with #1000 for 4.5 sec | smooth | smooth | smooth |

TABLE 2

| Examples | Control | | |
|---|---|---|---|
| | 1 | 2 | 3 |
| Run | Ionomer 1' | Ionomer 2' | Ionomer 3' |
| n) $Na_2CO_3$ powder | — | 0.46 | 0.63 |
| o) $Mg(OH)_2$ powder | 2.04 | 1.80 | 1.05 |
| d) TPU | — | — | 20.0 |
| e) NDA | — | — | 0.7 |
| f) PO | — | — | 0.2 |
| g) Polymer 1 | 50 | 50 | 25.0 |
| h) Polymer 2 | 50 | 50 | 25.0 |
| i) Polymer 3 | — | — | 10.0 |
| j) Polymer 4 | — | — | 10.0 |
| k) Polymer 5 | — | — | 10.0 |
| l) $TiO_2$ | 2.5 | 2.5 | 2.5 |
| m) Blue pigment | 0.025 | 0.025 | 0.07 |
| MFR (g/10 min, 190° C.) | 3.7 | 4.4 | 3.6 |
| Hardness (Shore D) | 58 | 57 | 50 |
| Ultimate tensile strength (MPa) | 25 | 24 | 18 |
| Ultimate tensile elongation (%) | 331 | 349 | 373 |
| Deflection (mm) | 2.85 | 2.87 | 3.01 |
| Initial velocity (m/s) | 76.52 | 76.45 | 76.04 |
| Average COR ($1^{st}$ shot to $10^{th}$ shot) | 0.760 | 0.759 | 0.738 |
| Shot number (durability) | 176 | 197 | 219 |
| Scuff resistance | 3 | 3 | 4 |
| Abrasion resistance | 3 | 4 | 5 |
| Ball surface after trimming with #1000 for 4.5 sec | less rough | less rough | rough |

Ingredient names in above Tables 1 and 2 are explained below.

a. Chelating Agent α
Ethylenediaminetetraacetic acid magnesium disodium tetrahydrate, produced by Chelest Corporation.
b. Chelating Agent β
Magnesium acetylacetonate dihydrate, produced by Tokyo Kasei Kogyo Co., Ltd.
c. MgMB
Magnesium hydroxide/ethylene-methacrylic acid-isobutyl acrylate terpolymer=50/50 wt %.
d. TPU
Aliphatic polyurethane (HMDI-PCL), produced by DIC-Bayer.
e. NDA
5-Norbornene-2,3-dicarboxylic anhydride, produced by Hitachi Chemical.
f. PO
2,5-Dimethyl-2,5-di(t-butylperoxy)hexyne-3, produced by NOF Corporation.
g. Polymer 1
Ethylene-methacrylic acid copolymer (MFR, 60 g/10 min), produced by DuPont.
h. Polymer 2
Ethylene-methacrylic acid copolymer (MFR, 25 g/10 min), produced by DuPont.
i. Polymer 3
Ethylene-methacrylic acid copolymer (MFR, 500 g/10 min), produced by DuPont.
j. Polymer 4
Ethylene-methacrylic acid-isobutyl acrylate terpolymer (MFR, 31 g/10 min), produced by DuPont.
k. Polymer 5
Ethylene-methacrylic acid-isobutyl acrylate terpolymer (MFR, 7 g/10 min), produced by ARKEMA.
l. $TiO_2$
Tipaque PF737, produced by Ishihara Sangyo Kaisha.
m. Blue Pigment
Color Index (CI) Pigment Blue 29, produced by Toyo Ink.
n. $Na_2CO_3$ Powder
Sodium carbonate (Tokujet), produced by Tokuyama Corporation.
o. $Mq(OH)_2$ Powder
Magnesium hydroxide (Kisuma 1), produced by Kyowa Chemical Industry.

The tests appearing in the tables are explained below.

MFR (q/10 min)
The melt flow rate was measured in accordance with JIS-K7210 at a test temperature of 190° C. and a test load of 21.18 N (2.16 kgf).

Shore D Hardness
The Shore D hardness was measured in accordance with ASTM D-2240.

Tensile Elongation (%), Tensile Strength (MPa)
Measured in accordance with JIS-K7161.

Deflection (mm)
The golf ball was placed on a steel plate, and the deflection (mm) by the ball when compressed under a final load of 1,275 N (130 kgf) from an initial load of 98 N (10 kgf) was measured. This test was carried out at 23±1° C.

Initial Velocity (m/sec)
The initial velocity was measured using an initial velocity measuring apparatus of the same type as the USGA drum rotation-type initial velocity instrument approved by the R&A. The ball was temperature-conditioned for 3 hours at 23±1° C., then tested at the same temperature by being hit with a 250-pound (113.4 kg) head (striking mass) at an impact velocity of 143.8 ft/s (43.83 m/s). Ten balls were each hit twice. The time taken to traverse a distance of 6.28 ft (1.91 m) was measured and used to compute the initial velocity of the ball. This cycle was carried out over a period of about 15 minutes.

Coefficient of Restitution (COR)
The ball was fired from an air cannon against a steel plate at a velocity of 43 m/s, and the rebound velocity was measured. The coefficient of restitution (COR) is the ratio of the rebound velocity to the initial velocity of the ball. Each value shown in the table is the average of ten measurements.

Shot Number (Durability)
The durability of the golf ball was evaluated using an ADC Ball COR Durability Tester produced by Automated Design Corporation (U.S.). A ball was fired using air pressure and made to repeatedly strike two steel plates arranged in parallel. The average number of shots required for the ball to crack was treated as its durability. These average values were obtained by furnishing four balls of the same type for testing, repeatedly firing each ball until it cracked, and averaging the number of shots required for each ball to crack. The type of tester used was a horizontal COR durability tester, and the incident velocity of the balls on the steel plates was 43 m/s.

Scuff Resistance
The golf balls were held at a temperature of 23±1° C. and hit at a head speed of 33 m/s using a pitching wedge mounted on a swing robot machine, after which damage from the impact was visually rated according to the following scale.
Best: 1 point
Better: 2 points
Good (ordinary): 3 points
Poor: 4 points
Poorer: 5 points
Poorest: 6 points Abrasion Resistance
A tubular container having a five-liter volume was filled with 15 golf balls and 1.7 liters of sand, after which the contents were mixed at 50 rpm for 2 hours. The balls were then removed and, based on a visual determination of the extent of surface abrasion and decreased gloss due to abrasion, the abrasion resistance was rated as follows.
Best: 1 point
Better: 2 points
Good (ordinary): 3 points
Poor: 4 points
Poorer: 5 points
Poorest: 6 points Ball Appearance After Surface Trimming
The surface of the injection-molded golf ball was trimmed with a #1000 grinding wheel for 4.5 seconds, following which the surface appearance of the ball was rated as follows.
Smooth
Less rough
Rough

The invention claimed is:
1. A golf ball material comprising:
(A) a metal-containing chelating agent (A1) or a mixture (A2) composed of a metal-containing chelating agent and an oxygen-containing inorganic metal compound;
(B) one or more polymers selected from the group consisting of diene polymers, thermoplastic polymers and thermoset polymers; and

(C) one or more acid-containing polymers having an acid content of from 0.5 to 30 wt % and selected from the group consisting of olefin-unsaturated carboxylic acid copolymers, olefin-unsaturated carboxylic acid-unsaturated carboxylic acid ester terpolymers, unsaturated carboxylic acid anhydride-containing polymers, unsaturated dicarboxylic acid-containing polymers and unsaturated dicarboxylic acid half ester-containing polymers;

which is obtained by blending component A with a mixture of components B and C, further comprising, in mixture with components A to C, a norbornene dicarboxylic anhydride and/or a derivative thereof, and a peroxide.

2. The golf ball material of claim 1 wherein the metal-containing chelating agent is one or more selected from the group consisting of chelating agents which are aminocarboxylic acids, polycarboxylic acids, hydroxycarboxylic acids, polyphosphoric acids, β-diketones, polyimines, polyamines and derivatives thereof and which contain one or more type of metal selected from among metals having a valence of 1, 2 or 3.

3. The golf ball material of claim 1, wherein the mixture (A2) composed of a metal-containing chelating agent and an oxygen-containing inorganic metal compound includes one or more oxygen-containing inorganic metal compound selected from among lithium carbonate, sodium carbonate, potassium carbonate, magnesium carbonate, calcium carbonate, zinc carbonate, magnesium hydroxide, magnesium oxide, calcium hydroxide, calcium oxide and zinc oxide, which is used in the form of ultrafine particles or a masterbatch.

4. The golf ball material of claim 1, wherein the mixture (A2) of a metal-containing chelating agent and an oxygen-containing inorganic metal compound includes the metal-containing chelating agent in a proportion of from 0.1 to 99.9 wt %.

5. The golf ball material of claim 1, wherein the oxygen-containing inorganic metal compound has an average particle size of from 0.001 to 50 μm.

6. The golf ball material of claim 1, wherein the oxygen-containing inorganic metal compound is in the form of ultrafine particles having an average particle size of from 0.005 to 0.1 μm and a particle size distribution of 0.001 to 1.0 μm.

7. The golf ball material of claim 1, wherein the oxygen-containing metal compound is one or more selected from the group consisting of lithium carbonate, sodium carbonate, potassium carbonate, magnesium carbonate, calcium carbonate, magnesium oxide, zinc oxide and calcium oxide.

8. The golf ball material of claim 1, wherein the oxygen-containing inorganic metal compound has been prepared as a masterbatch in which the oxygen-containing inorganic metal compound has an average particle size of from 0.005 to 50 μm and a particle size distribution of 0.001 to 300 μm.

9. The golf ball material of claim 1, wherein the oxygen-containing metal compound is one or more selected from the group consisting of lithium carbonate, sodium carbonate, potassium carbonate, magnesium carbonate, zinc carbonate, magnesium hydroxide, magnesium oxide, calcium hydroxide, calcium oxide and zinc oxide.

10. The golf ball material of claim 1, wherein the oxygen-containing inorganic metal compound has been prepared as a masterbatch which comprises 20 to 80 wt % of the oxygen-containing inorganic compound in mixture with a base polymer material having a melt flow rate (MFR) of at least 10 g/10 min.

11. The golf ball material of claim 1, wherein the oxygen-containing inorganic metal compound has been prepared as a masterbatch at a mixing temperature in a range of 50 to 220° C. using an apparatus selected from the group consisting of twin-screw/single-screw extruders equipped with a kneader and a force feeder, tandem extruders, and vacuum-vented twin-screw extruders.

12. The golf ball material of claim 1, wherein component B is one or more selected from the group consisting of polyolefin elastomers, polystyrene elastomers, polyacrylate polymers, polyamide elastomers, polyurethane elastomers, polyester elastomers, diene polymers, polyacetals, epoxy resins, unsaturated polyester resins, silicone resins and ABS resins.

13. The golf ball material of claim 1, wherein components B and C are mixed in a weight ratio B/C of from 99/1 to 1/99.

14. The golf ball material of claim 1, wherein component B is a thermoset polymer, and components B and C are mixed in a weight ratio B/C of from 49/51 to 1/99.

15. The golf ball material of claim 1, wherein component A1 and/or component A2 are mixed in an amount, with respect to the mixture of components B and C, which is selected in accordance with the degree to which acid groups in the mixture of components B and C are to be neutralized.

16. The golf ball material of claim 1, which additionally includes, in mixture with components A to C, one or more additive selected from the group consisting of pigments, dispersants, compatibilizing agents, antioxidants, ultraviolet absorbers, light stabilizers, crosslinking agents and slip agents.

17. A method for preparing a golf ball material comprising, in a mixture:

(A) a metal-containing chelating agent (A1) or a mixture (A2) composed of a metal-containing chelating agent and an oxygen-containing inorganic metal compound;

(B) one or more polymers selected from the group consisting of diene polymers, thermoplastic polymers and thermoset polymers; and (C) one or more acid-containing polymers having an acid content of from 0.5 to 30 wt % and selected from the group consisting of olefin-unsaturated carboxylic acid copolymers, olefin-unsaturated carboxylic acid-unsaturated carboxylic acid ester terpolymers, unsaturated carboxylic acid anhydride-containing polymers, unsaturated dicarboxylic acid-containing polymers and unsaturated dicarboxylic acid half ester-containing polymers, the method being comprised of carrying out on a mixture of components B and C in a single step, with (A1) and/or (A2), a reaction which neutralizes the acid groups in the acid-containing polymer, further comprising, in mixture with components A to C, a norbornene dicarboxylic anhydride and/or a derivative thereof, and a peroxide.

18. The golf ball material-preparing method of claim 17, wherein the acid-neutralizing reaction by (A1) and/or (A2) on the acid-containing polymer mixture of components B and C is carried out in a single step using a twin-screw extruder having arranged therein a screw segment with a kneading disc zone.

19. The golf ball material-preparing method of claim 17 wherein the twin-screw extruder has a length-to-diameter (L/D) ratio of at least 20.

20. The golf ball material-preparing method of claim 17 wherein the screw segment in the twin-screw extruder is arranged so that the kneading disc zone has an L/D ratio which is from 10 to 90% of the overall L/D ratio.

21. The golf ball material-preparing method of claim 17, wherein the kneading disc zone of the twin-screw extruder includes right-handed kneading discs, left-handed kneading discs, reverse discs, and various neutral discs.

22. The golf ball material-preparing method of claim 17, wherein the twin-screw extruder has a screw diameter of at least 15 mm.

23. The golf ball material-preparing method of claim 17, wherein the twin-screw extruder has a vent port and a vacuum line connected thereto.

24. The golf ball material-preparing method of claim 17, wherein the twin-screw extruder is equipped with a device for the dropwise addition or pressurized injection of a liquid.

25. The golf ball material-preparing method of claim 17, wherein the liquid is a compound of the formula ROH (R being hydrogen or an alkyl group) and is added in an amount, based on the resin output, of from 0.1 to 10 wt %.

26. The golf ball material-preparing method of claim 17, wherein the acid-neutralizing reaction in the twin-screw extruder is carried out at a setting temperature of from 110 to 260° C.; at an output, for a screw diameter (D) of 32 mm, of from 2 to 60 kg/h; and such that, letting the screw diameter ratio $D_1/D_2$ ($D_1$ being larger than $D_2$) be A, the output during scale-up of the twin-screw extruder is proportional to A within a range of $A^{1.0}$ to $A^{3.0}$.

27. A golf ball comprising a part molded from the golf ball material of any one of claims 1, 2-16 or 17.

28. A golf ball comprising the golf ball material of any one of claims 1, 2-16 or 17, wherein the golf ball material is used as a cover material in a two-piece solid golf ball comprising a core and a cover encasing the core, or as a cover material or an intermediate layer material in a multi-piece solid golf ball comprising a core of at least one layer, one or more intermediate layers encasing the core, and a cover of at least one layer encasing the intermediate layers.

* * * * *